United States Patent
Trakhimovich (10) Patent No.: US 10,704,951 B2
(45) Date of Patent: Jul. 7, 2020

(54) LOW-PROFILE LOAD CELL ASSEMBLY WITH VERTICAL WEIGHT ADAPTER

(71) Applicant: SHEKEL SCALES (2008) LTD., Beit Keshet (IL)

(72) Inventor: Michael Trakhimovich, Gan Ner (IL)

(73) Assignee: SHEKEL SCALES (2008) LTD., Beit Keshet (IL)

( * ) Notice: Subject to any disclaimer, the term of this patent is extended or adjusted under 35 U.S.C. 154(b) by 0 days.

(21) Appl. No.: 16/351,727

(22) Filed: Mar. 13, 2019

(65) Prior Publication Data

US 2019/0301921 A1    Oct. 3, 2019

Related U.S. Application Data

(63) Continuation of application No. 15/329,126, filed as application No. PCT/IB2015/055905 on Aug. 3, 2015, now Pat. No. 10,274,359.

(30) Foreign Application Priority Data

Aug. 3, 2014 (GB) .................................. 1413735.0

(51) Int. Cl.
*G01G 3/14* (2006.01)
*G01G 21/14* (2006.01)

(52) U.S. Cl.
CPC ........... *G01G 3/1412* (2013.01); *G01G 21/14* (2013.01)

(58) Field of Classification Search
CPC .............................. G01G 3/1412; G01G 21/14
USPC ........................................................ 177/187
See application file for complete search history.

(56) References Cited

U.S. PATENT DOCUMENTS

| | | | | |
|---|---|---|---|---|
| 3,985,025 A * | 10/1976 | Ormond | ................ | G01L 1/2231 177/255 |
| 4,546,838 A * | 10/1985 | Ormond | ................ | G01G 21/12 177/211 |
| 4,600,066 A * | 7/1986 | Griffen | ................ | G01G 3/1412 177/211 |
| 2005/0000304 A1 * | 1/2005 | Smith | ................ | G01B 7/18 73/862.637 |
| 2014/0262557 A1 * | 9/2014 | Johnson | ................ | G01G 3/14 177/211 |

* cited by examiner

*Primary Examiner* — Natalie Huls
*Assistant Examiner* — Monica S Young
(74) *Attorney, Agent, or Firm* — Marc Van Dyke; Momentum IP Group (57) ABSTRACT

A load cell assembly, including an adapter adapted to receive a vertical load, and having loaded and unloaded dispositions a load cell body including a spring element having a first cutout window defined by a top beam and a bottom beam, the window transversely disposed through the body, the spring element adapted such that responsive to a downward force exerted on a top face of the adapter, the beams assume a primary double-bending configuration a strain-sensing gage, attached to the spring element, the strain-sensing gage for measuring strain in the spring element; and an at least two-dimensional flexural member having a second cutout window, the second cutout window being transversely disposed through the body; the adapter disposed in mechanical relation to the flexural member such that, in the loaded disposition of the adapter, the flexural member assumes a secondary, substantially double-bending configuration.

20 Claims, 5 Drawing Sheets

LOW-PROFILE LOAD CELL ASSEMBLY WITH VERTICAL WEIGHT ADAPTER

This invention claims priority to U.S. patent application Ser. No. 15/329,126 which is incorporated by reference for all purposes as if fully set forth herein. U.S. patent application Ser. No. 15/329,126 is a 371 national stage entry of PCT/IB2015/055905 filed on Aug. 3, 2015 which is incorporated by reference for all purposes as if fully set forth herein. PCT/IB2015/055905 claims priority from Great Britain Application Number 1413735.0, filed Aug. 3, 2014, which application is incorporated by reference for all purposes as if fully set forth herein.

FIELD AND BACKGROUND OF THE INVENTION

The present invention relates to weight measurement devices, and more particularly, to weighing devices employing load cell assemblies having integral flexures.

Load cells are employed extensively in weighing scales because of their accuracy in measuring weights. Such load cells, or transducers, may have a metallic body having a generally rectangular perimeter. Opposing surfaces of the perimeter may carry surface-mounted, resistor strain gauges, interconnected to form an electrical bridge. The central portion of the body may have a rigidly-designed opening beneath the strain gauges to define a desired bending curve in the body of the load cell. The body of the load cell is adapted and disposed to provide cantilevered support for the weighing platform. Thus, when a weight is applied to the weighing platform, temporary deformations in the load cell body are translated into electrical signals that are accurately and reproducibly responsive to the weight. When the weight on the platform is removed, the metallic load cell body is designed to return to an original, unstressed condition.

The inventor has determined the need for improved accuracy in low-profile load cell assemblies.

SUMMARY

According to the teachings of the present invention there is provided a load cell assembly, including: (a) a load cell body including a spring element having a first cutout window at least partially defined by a top beam on a top side of the load cell body and a bottom beam, the window transversely disposed through a long dimension of the body; (b) an adapter adapted to receive a vertical load, the adapter disposed on the top side of the load cell body, the adapter having a first end, distal to the spring element, and a second end, opposite the first end, proximal to the spring element, the adapter having an unloaded disposition and a loaded, depressed disposition, in which, optionally, the second end is depressed with respect to the first end; (c) at least one strain-sensing gage, bonded to the spring element, the strain-sensing gage adapted to measure a strain in the spring element; and (d) an at least two-dimensional flexural member having at least a second cutout window, the second cutout window being transversely disposed through the long dimension of the body, the flexural member being mechanically associated with the spring element, the flexural member disposed along a flexural longitudinal section of the load cell body that is defined by a length of the second cutout window along the long dimension, the flexural member being distally disposed, with respect to the spring element, distally along the long dimension of the body; the spring element adapted such that responsive to a downward force exerted on the adapter, the beams assume a primary double-bending configuration having an at least partial double-bending behavior; the adapter disposed in mechanical relation to the flexural member such that, in the loaded disposition of the adapter, the flexural member assumes a secondary double-bending configuration, having an at least partial double-bending behavior; wherein optionally, the load receiving position of the adapter is longitudinally positioned within the flexural longitudinal section of the load cell body; and wherein optionally, the adapter has an anchored end distal to the flexural member, and an adaptive end proximal to the flexural member.

According to yet another aspect of the present invention there is provided a load cell assembly, including: (a) an adapter adapted to receive a vertical load, and having an unloaded disposition and a loaded disposition; (b) a load cell body including a spring element having a first cutout window at least partially defined by a top beam and a bottom beam, the window transversely disposed through the body, the spring element adapted such that responsive to a downward force exerted on a top face of the adapter, the beams assume a primary double-bending configuration having an at least partial double-bending behavior; (c) at least one strain-sensing gage, bonded to the spring element, the strain-sensing gage adapted to measure a strain in the spring element; (d) an at least two-dimensional flexural member having at least a second cutout window, at least a portion of the second cutout window being transversely disposed through the body; (e) a weighing platform; and (f) a base; the load cell body disposed between the platform and the base, the body secured to the platform at a first position along a length of the body, and secured to the base at a second position along the length.

According to further features in the described preferred embodiments, the adapter has an unloaded disposition and a loaded, depressed disposition, in which the second end is depressed with respect to the first end.

According to still further features in the described preferred embodiments, the load receiving position of the adapter is longitudinally positioned within the flexural longitudinal section of the load cell body.

According to still further features in the described preferred embodiments, the adapter has an anchored end distal to the flexural member, and an adaptive end proximal to the flexural member.

According to still further features in the described preferred embodiments, the adapter and the flexural member are integral with the load cell body.

According to still further features in the described preferred embodiments, the load cell body is a monolithic load cell body integrally including the spring element and the flexural member, and optionally, the adapter.

According to still further features in the described preferred embodiments, the load cell body has, along a longitudinal axis thereof, a first adaptive end and an anchored region, the spring element being longitudinally disposed distal to the region, towards the adaptive end; and the flexural member being disposed between the spring element and the adaptive end.

According to still further features in the described preferred embodiments, a height of the load cell body or the double load cell body is at most 30 mm, at most 25 mm, at most 20 mm, at most 15 mm, at most 14 mm, at most 13 mm, or at most 12.5 mm.

According to still further features in the described preferred embodiments, a top surface of adapter, in the unloaded disposition, is at most 6 mm, at most 5 mm, at most 4 mm, at most 3 mm, at most 2 mm, or at most 1 mm above a top surface of the flexural member mechanically associated with the adapter.

According to still further features in the described preferred embodiments, the secondary double-bending configuration improves the partial double-bending behavior of the spring element.

According to still further features in the described preferred embodiments, the secondary double-bending configuration at least partially compensates for a parasitic mode of the primary double bending configuration.

According to still further features in the described preferred embodiments, the adapter has a longitudinal length La between the first and second ends of the adapter, and the load receiving position is disposed on an inner half of La.

According to still further features in the described preferred embodiments, the load receiving position is disposed on an inner third or on an inner quarter of the longitudinal length La.

According to still further features in the described preferred embodiments, the load receiving position is disposed on an inner half of the length of the second cutout window.

According to still further features in the described preferred embodiments, the load receiving position is disposed on an inner third or on an inner quarter of the length of the second cutout window.

According to still further features in the described preferred embodiments, the load receiving element is disposed within an area defined by a projection from a top side of the load cell body on the flexural member.

According to still further features in the described preferred embodiments, wherein, in the loaded disposition, the load receiving element is disposed or at least partially disposed within a hollow volume of the flexural member.

According to still further features in the described preferred embodiments, the adapter disposed with respect to the flexural member such that in the loaded disposition, a top plane or face of the adapter is depressed with respect to a top plane or face of the flexure member.

According to still further features in the described preferred embodiments, the second cutout window includes a plurality of windows, the windows optionally disposed one on top of another.

According to still further features in the described preferred embodiments, the plurality of windows has an average length $L_{avg}$, a maximum dimensionless length deviation of any of the windows from $L_{avg}$, being defined by:

$$|L_i - L_{avg}|/L_{avg}.$$

$L_i$ being a particular length of any of the windows; the maximum dimensionless length deviation being less than 0.2, less than 0.15, less than 0.10, less than 0.07, less than 0.05, less than 0.03, less than 0.02, less than 0.015, less than 0.01, or less than 0.005.

According to still further features in the described preferred embodiments, the load cell body is a monolithic double load cell body integrally including the spring element and the flexural member of each of the assemblies.

According to still further features in the described preferred embodiments, the monolithic double load cell body integrally includes the adapter of each of the assemblies.

According to still further features in the described preferred embodiments, the assembly further includes a weighing platform disposed on a top face of the load cell body or the double load cell body, and a base disposed underneath the load cell body or the double load cell body.

According to still further features in the described preferred embodiments, a total height of the platform, the load cell body or the double load cell body, and the base, in an assembled configuration, is at most 40 mm, at most 35 mm, at most 30 mm, at most 25 mm, at most 22 mm, or at most 20 mm.

According to still further features in the described preferred embodiments, a total height of the platform, the load cell body or the double load cell body, and the base, in an assembled configuration, is at most 5 mm, at most 7.5 mm, at most 10 mm, at most 12 mm, at most 15 mm, at most 18 mm, or at most 20 mm more than a height of the load cell body or the double load cell body.

According to still further features in the described preferred embodiments, the assembly is adapted to weigh, in a single weighing, at least one item having a total weight of up to 40 kg, up to 35 kg, up to 30 kg, up to 25 kg, up to 20 kg, or up to 15 kg.

According to still further features in the described preferred embodiments, the assembly provides a weighing accuracy of at least 1/3000 divisions for weighing items having a weight within a range of 50 grams to 15,000 grams.

According to still further features in the described preferred embodiments, the double load cell body is centrally anchored to the base.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are used to designate like elements.

In the drawings.

DESCRIPTION OF THE PREFERRED EMBODIMENTS

The principles and operation of the low-profile load cell assembly according to the present invention may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Load cells with low profiles may have a small signal and therefore limitations in the total weight to be measured and due to the inherent sensitivity of load cells, there may be noise and an unacceptable settling time in the use of such devices. The current invention resolves or appreciably reduces parasitic noise issues with low profile load cells and enables measurements with high accuracy.

As used herein in the specification and in the claims section that follows, the term "spring element", and the like, refers to a spring unit having one or more strain gages associated therewith. As shown in the figures and described herein, the spring element is disposed along a longitudinal section of the load cell body that is defined by a length of the cutout window of the spring element along the long dimension of the load cell body. The at least one strain gage associated with the spring element is longitudinally positioned within this longitudinal section of the load cell body.

Figure 1A:
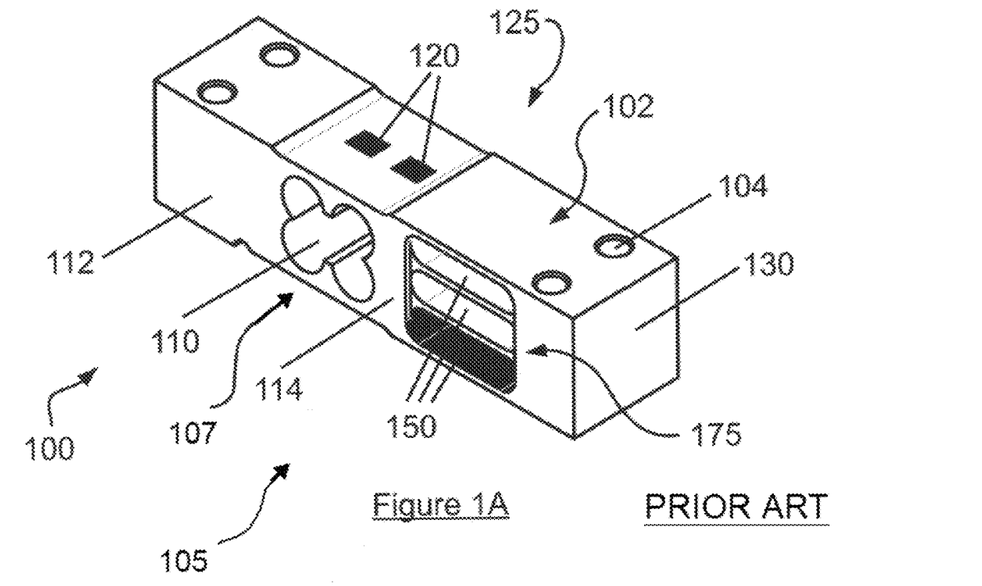
FIG. 1A is a simplified perspective view of a prior art load cell assembly.
Figure 1B:
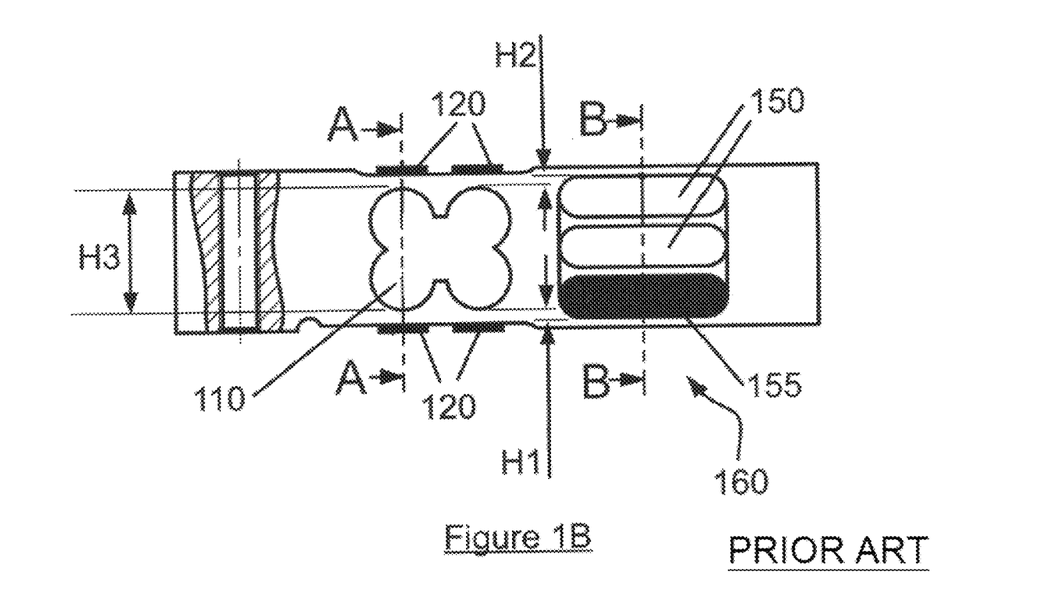
FIG. 1B is a schematic side view of the load cell assembly of FIG. 1A, with a partial cross-sectional view at the left end of the assembly.
Figure 1C:
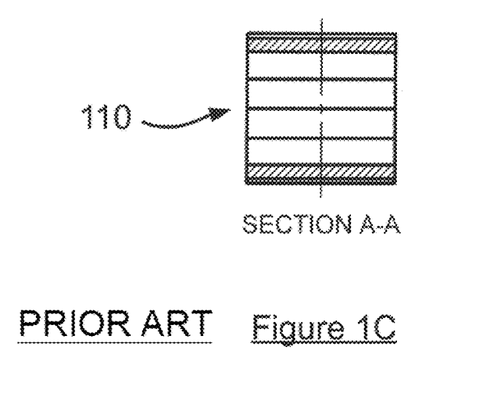
FIG. 1C is a transverse cross-sectional view of the load cell assembly of FIG. 1A, taken along the A-A plane shown in FIG. 1B.

As used herein in the specification and in the claims section that follows, the term "flexural member", "flexure", and the like, refers to a spring element that is completely devoid of strain gages. Referring now to the drawings, FIG. 1A is a simplified perspective view of a load cell and flexure assembly 100 (also termed load cell assembly) according to my previous patent publication no. WO/2013/164675, assigned to Shekel Scales (2008) Ltd. FIG. 1B provides a schematic side view of the load cell assembly of FIG. 1A, with a partial cross-sectional view at the left end of the assembly. Transverse cross-sectional views are provided in FIG. 1C (along the A-A line) and FIG. 1D (along the B-B line).

A load cell body 125 may be made from a block of load cell quality metal or alloy. Referring collectively to FIGS. 1A-1D, at least one transverse cutout or cutout window 110 is disposed in a side of load cell body 125, to form bending beams above and below the cutout. These beams and cutout 110 form a spring element 107 of load cell body 125. The beams are held in fixed parallel relationship by end blocks 112, 114 on both ends of load cell body 125. Load cell arrangement 105 may include strain-sensing gages 120 adapted and positioned to measure the strains caused by a force applied to the top of the ("free" or "adaptive" side of) load cell body 125. When a vertical load acts on a free end (i.e., an end unsupported by the base, as shown in FIG. 2) 130 of load cell body 125, the load cell body undergoes a slight deflection or distortion, with the bending beams assuming a double-bending configuration having an at least partial, and typically primarily or substantially, double-bending behavior. The distortion is measurably sensed by strain gages 120.

The load cell body may also have a hole, threaded hole, or receiving element (not shown) for receiving or connecting to a base or base element of the weighing system. Towards free end 130 of the load cell body, an adapter 102 disposed on a top face of load cell body 125 may have one or more hole, threaded hole, or receiving element 104 for receiving or connecting to a platform of the weighing system.

Figure 1D:
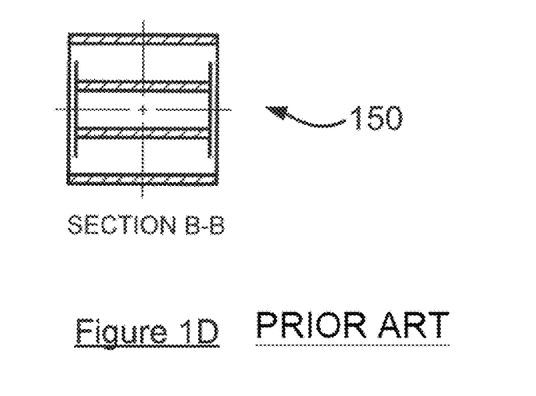
FIG. 1D is a transverse cross-sectional view of the load cell assembly of FIG. 1A, taken along the B-B plane shown in FIG. 1B.

Load cell and flexure assembly 100 may also have at least one transverse cutout or cutout "window" 150 formed in the side of the load cell body, in lateral position with respect to the transverse cutout(s) associated with the strain gages 120. In FIGS. 1A, 1B, and 1D are shown three such windows, disposed one on top of the other. The windows may be of a substantially rectangular profile. The ends of the windows may have a rounded or hemi-circular profile, substantially as shown.

Windows 150 may advantageously provide additional flexibility to the load cell body, and absorb excessive impact delivered to the body. Thus, windows 150 may form or partially form a flexure or shock-absorbing arrangement 175. Thus, flexure or shock-absorbing arrangement 175 is integral with load cell body 125 (e.g., both are disposed within a monolithic load cell body such as a monolithic block of alloy, aluminum metal, or aluminum-containing alloy suitable for use as a load cell body), within load cell and flexure assembly 100.

Windows 150 may be disposed in the proximal side of the load cell body, with respect to the free end 130 of the load cell body. In other words, windows 150 may be disposed longitudinally in-between transverse cutout 110 and free end 130.

Figure 1E:
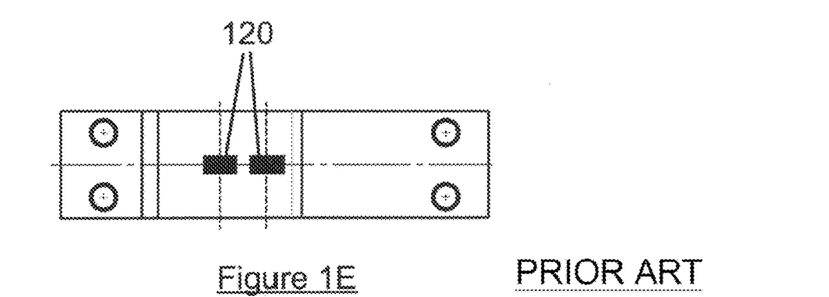
FIG. 1E is a schematic top view of the load cell assembly of FIG. 1A.

FIG. 1E provides a schematic top view of the load cell assembly of FIG. 1A, showing two strain sensing gages 120 disposed on a top surface of the load cell body.

Figure 1F:
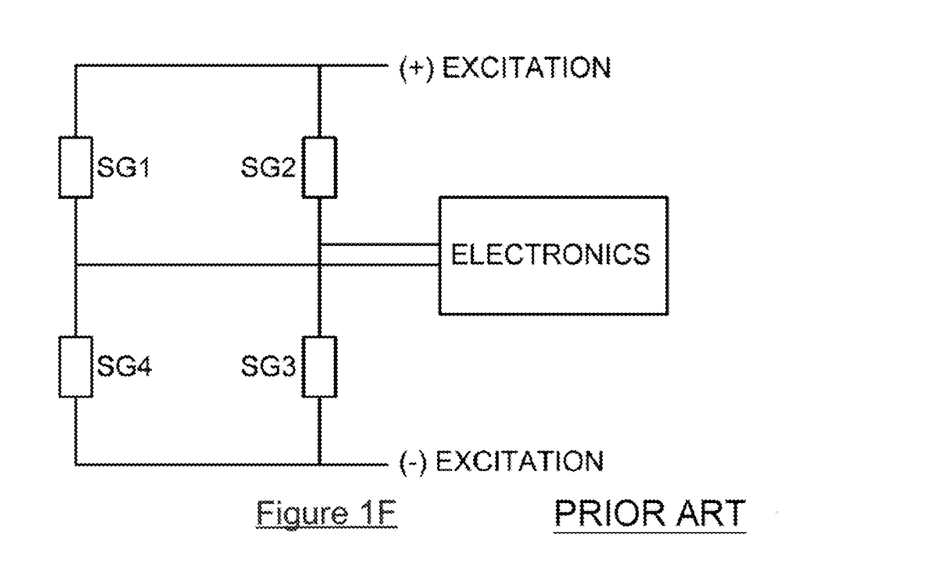
FIG. 1F is a conventional schematic diagram of the strain gage electronics.

FIG. 1F provides a conventional schematic diagram of the strain gage electronics, which may be used in, or with, the load cell assemblies and weighing modules of the present invention. The load cell system may further include a processing unit, such as a central processing unit (CPU). The processing unit may be configured to receive the load or strain signals (e.g., from 4 strain gages SG1-SG4) from each particular load cell and to produce a weight indication based on the load signals, as is known to those of ordinary skill in the art.

Figure 2A:
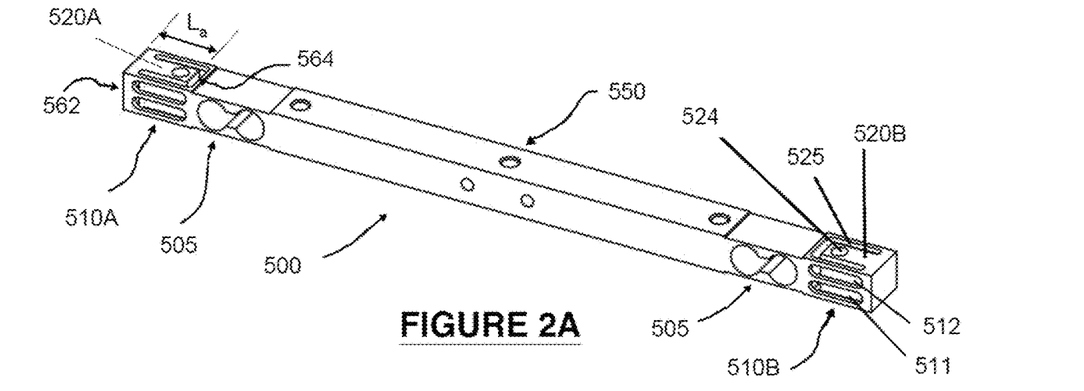
FIG. 2A is a perspective view of a double ended bending beam having an adapter disposed generally within an integral two-dimensional flexure, according to an embodiment of the present invention.

FIG. 2A is a perspective view showing a top and side of a double ended bending beam load cell assembly 500, including first and second spring elements 505, (at least) first and second integral two-dimensional flexures (or flexural members) 510A and 510B, and first and second adapters 520A and 520B, according to an exemplary embodiment of the present invention. Load cell assembly 500 includes, along a longitudinal axis thereof, two adaptive ends and a central anchored region, with first and second spring elements 505 being longitudinally disposed distal to the anchored region, towards each of the adaptive ends; and first and second flexural members 510A and 510B being disposed between respective spring elements and respective adaptive ends. Two-dimensional flexures (or flexural members) 510A and 510B, each have at least one cutout window transversely disposed through a load cell body 550.

A flexural longitudinal section of the load cell body may be defined, for each flexural member 510A and 510B, by a length (i.e., maximum length) of the at least one cutout window. It must be emphasized that load cell assembly 500 may be constructed as a single ended bending beam, or as a pair of single ended bending beams. In the case of a single ended beam structure, the load cell body may have, along a longitudinal axis thereof, an adaptive end and an anchored region, with a spring element being longitudinally disposed distal to the anchored region, towards the adaptive end, and the flexural member being disposed between the spring element and the adaptive end.

Adapter 520A, which, in similar fashion to other load cell body adapters described hereinabove, may be adapted to receive vertical (and optionally, horizontal forces) from a weighing platform. In the exemplary embodiment provided in FIG. 2A, adapter 520A is largely disposed within the hollow volume of flexure 510A. Significantly, the load receiving element (such as hole or screw hole 524) through which adapter 520A receives forces from a weight or from weighing platform (see FIG. 3 and the associated description), may be disposed within the top profile of flexure 510A (or within an area defined by a projection from a top side of load cell assembly 500 on flexure 510A), and in the direction of the longitudinal center of load cell body 550. In the exemplary embodiment provided in FIG. 2A, adapter 520A has a longitudinal length La between a first end of adapter 520A (a first end 562 of load cell body 550) and the opposite end 564 of that adapter, and screw hole 524 is disposed on the inner half of length La. In some cases, screw hole 524 is disposed on the inner third of length La, or on the inner quarter of length La. In some embodiments, the load receiving element or position is disposed on an inner half, inner third or inner quarter of the length of the at least one cutout window.

The second dimension of the integral two-dimensional flexure 510, including top-oriented cutout 525 around adapter 520, is adapted to serve as a horizontal shock-absorbing mechanism for the relatively delicate load cell spring element 505.

Figure 2B:
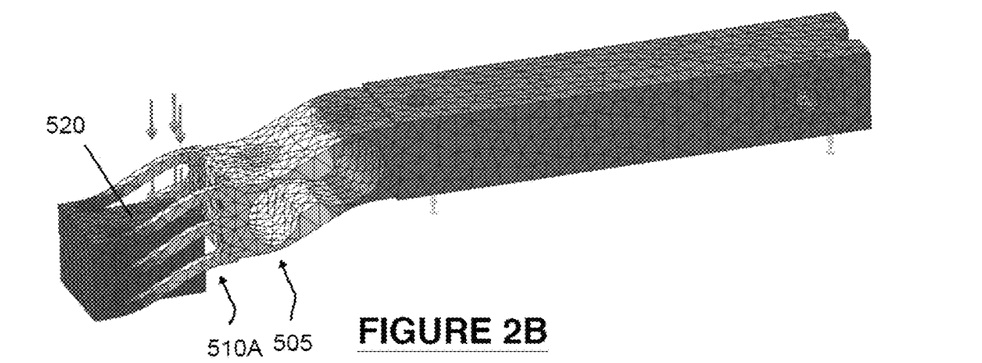
FIG. 2B is an exemplary static nodal stress plot showing a vertical deflection of the flexure arrangement and the load cell arrangement in one embodiment of the load cell assembly of the present invention.

FIG. 2B is an exemplary static nodal stress plot showing a vertical deflection of the flexure arrangement and the load cell arrangement in one embodiment of the load cell assembly of the present invention. The vertical displacement of adapter 520 relative to the flexure 510A is shown.

Figure 2C:
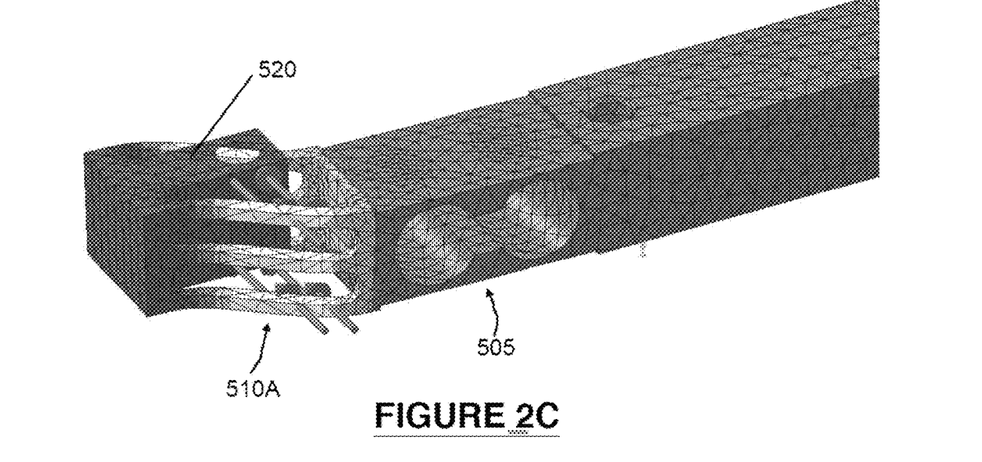
FIG. 2C is an exemplary static nodal stress plot showing a horizontal deflection of the flexure arrangement and the load cell arrangement in one embodiment of the load cell assembly of the present invention.

FIG. 2C is an exemplary static nodal stress plot showing a horizontal deflection of the flexure arrangement and the load cell arrangement in one embodiment of the load cell assembly of the present invention. The horizontal displacement of adapter 520 relative to the flexure 510A is shown.

One of ordinary skill in the art will readily appreciate that the responses to vertical and horizontal forces depicted in FIGS. 2B and 2C, respectively, also apply to single ended bending beams of the present invention. In these responses, the bending beams assume a double-bending configuration having an at least partial, and typically primarily or substantially solely, double-bending behavior.

Figure 2D:
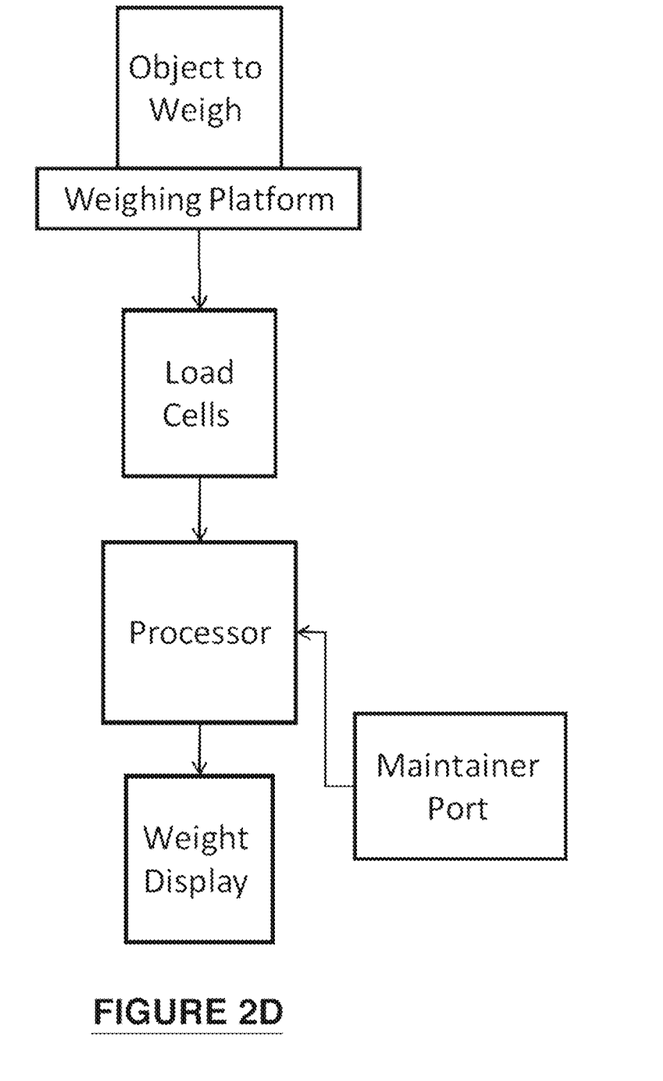
FIG. 2D is a block diagram of a weighing scale or load cell assembly, according to one embodiment of the present invention.

FIG. 2D is a block diagram of a weighing scale or load cell assembly. An object to be weighed is placed on the top plate of a weighing scale. During operation, vertical forces applied to the top plate are transferred via adapters (e.g., adapter 520) to load cell bodies (e.g., load cell body 550) configured to measure vertical forces. Electrical signals from the load cell strain gages are transmitted to a processor. The processor processes the signals to produce weight information, and may then transmit the weight information to a display device. A processor port may also be available for maintenance, calibration or firmware updates.

Figure 3:
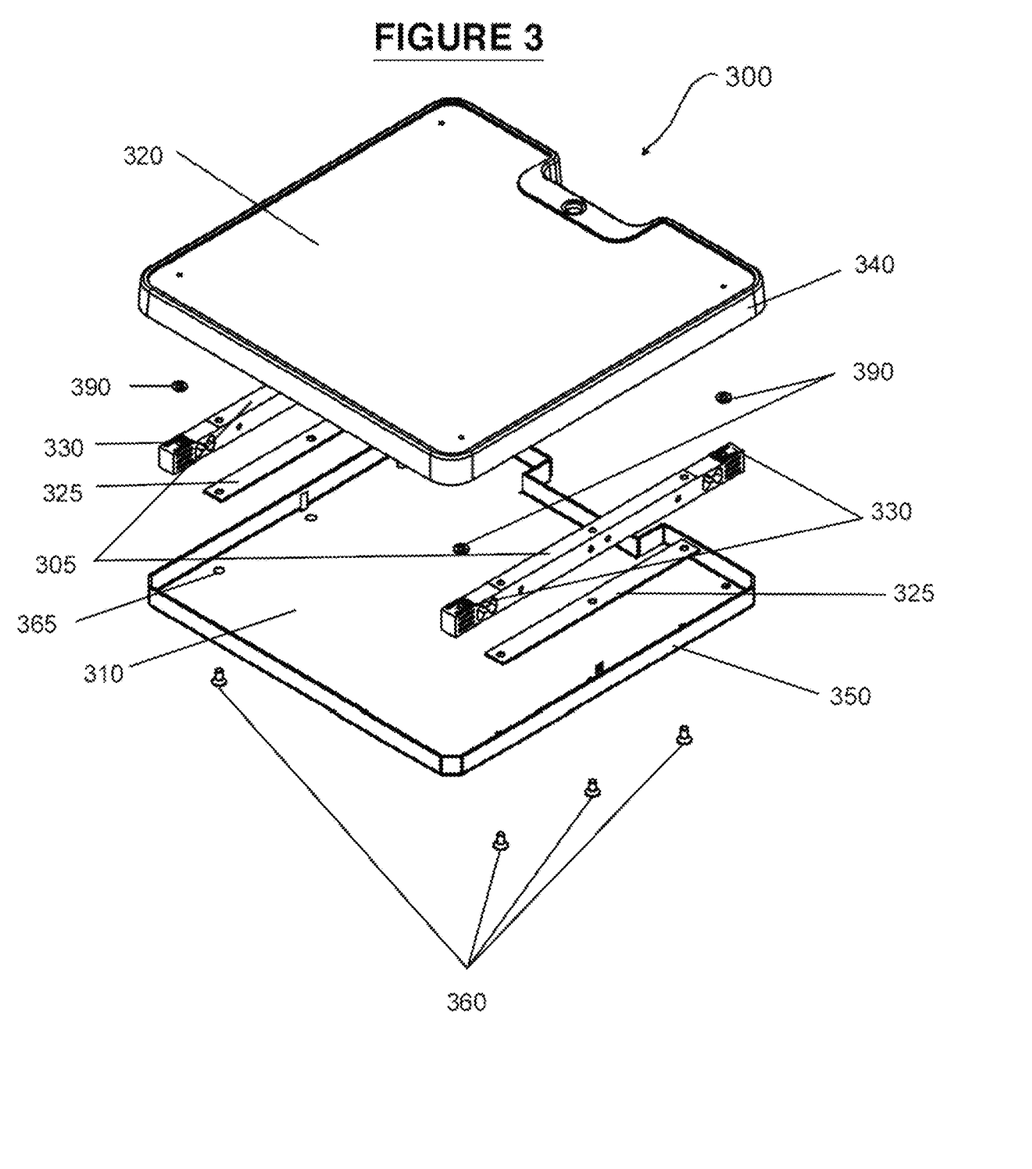
FIG. 3 is an exploded view of a low-profile load cell assembly, according to one embodiment of the present invention.

FIG. 3 is an exploded view of an exemplary weighing scale or load cell assembly 300, according to one embodiment of the present invention. Weighing scale 300 may be a low-profile weighing scale, substantially as shown. Weighing scale 300 may include at least one load cell assembly such as double ended bending beam load cell assembly 305, and a solid top plate 320 disposed above double ended bending beam load cell assembly 305, and connected thereto via adapters 330. A base 310, typically having a broad, flat bottom adapted to rest flush against a flooring, supports top plate 320 and load cell assembly 305, and anchors load cell assembly 305 via intervening shims 325 (to base 310) using bolts 360.

Exemplary low-profile weighing scale 300 may advantageously employ two double ended bending beam load cell assemblies 305.

Double ended bending beam load cell assemblies 305 may be similar or substantially identical to double ended bending beam load cell assembly 500, provided in FIG. 2A, and described hereinabove.

Load cell assemblies 305 may have monolithic double load cell bodies integrally including two spring elements and two at least two-dimensional flexural members. At each end of each of the load cell bodies, adapters 330 may be disposed at a top face of the load cell bodies, and are adapted to receive a vertical load transmitted from top plate 320. Washers 390 may be placed between adapters 330 and top plate 320 to ensure that the weight is transferred solely to adapters 330, and not to other locations on the load cell body.

In the exemplary embodiment provided in FIG. 3, overhanging vertical walls 340 of top plate 320 may fit over generally upright walls 350 of base 310.

In one embodiment, the adapter may be machined to an unloaded equilibrium height above the top surface of the flexural member or top of the load cell body. Typically, the adapter may protrude above the top surface of the flexural member by at most 6 mm, at most 5 mm, at most 4 mm, at most 3 mm, at most 2 mm, or at most 1 mm.

The overall height of weighing scale 300, in an assembled configuration (including top plate 320 and base 310), may be at most 5 mm, at most 7.5 mm, at most 10 mm, at most 12 mm, at most 15 mm, at most 18 mm, or at most 20 mm more than the height of the load cell body or load cell assembly 305.

The height of the load cell body or load cell assembly 305 may be the dominant contributor to the height of weighing scale 300. The height of the load cell body or load cell assembly 305 may be at most 30 mm, at most 25 mm, at most 20 mm, at most 15 mm, or at most 12.5 mm. The total height of weighing scale 300, in assembled form, may accordingly be at most 40 mm, at most 35 mm, at most 30 mm, at most 25 mm, at most 22 mm, at most 20 mm, or at most 17.5 mm.

The height of the load cell assembly 305 may be at least 6 mm or at least 7 mm, and more typically, at least 8 mm, at least 9 mm, or at least 10 mm.

Weighing scales employing load cell assemblies having vertical dimensions as described above may weigh, in a single weighing, at least one item having a total weight of up to 40 kg, up to 35 kg, up to 30 kg, up to 25 kg, up to 20 kg, or up to 15 kg. The weighing accuracy may be at least 1/3000 divisions, corresponding to a deviation of 0.03% from the actual weight for weighing items having a weight within a range of 50 grams to 15,000 grams.

Referring back to FIG. 1B, the height of transverse cutout 110 is defined as $H_3$. The height of flexure arrangement 175 extending above the top of transverse cutout 110 is defined as $H_1$, and the height of flexure arrangement 175 extending below the bottom of transverse cutout 110 is defined as $H_2$. The minimum value of each of $H_1$ and $H_2$ is zero (i.e., $H_1$ and $H_2$ do not assume negative values).

With regard to the load cell assemblies of the present invention, the inventor has found that it may be highly advantageous for the heights $H_1$, $H_2$, and $H_3$ to satisfy the relationship:

$$(H_1+H_2)/H_3<0.50.$$

It may be of further advantage for $(H_1+H_2)/H_3$ to be less than 0.40, less than 0.30, less than 0.25, less than 0.20, less than 0.15, less than 0.10, or less than 0.05. In some cases it may be of further advantage for $(H_1+H_2)/H_3$ to be substantially zero. This structural relationship may enable various low-profile scale modules, and may also enable facile retrofitting of the inventive load cell arrangement in existing weighing scales and weighing scale designs.

Referring back to FIG. 2A, side windows or cutouts 511, 512 of flexural members 510A and 510B, may have an average length $L_{avg}$. A maximum dimensionless length deviation from $L_{avg}$, of any of windows 511, 512, may be defined by:

$$|L_i-L_{avg}|/L_{avg},$$

where $L_i$ is a particular length of any of windows 511, 512. The maximum dimensionless length deviation may be less than 0.2, less than 0.15, less than 0.10, less than 0.07, less than 0.05, less than 0.03, less than 0.02, less than 0.015, less than 0.01, or less than 0.005.

In the embodiment provided in FIGS. 2A-2C, load cell assembly 500 may be adapted, when secured within a weighing module as described in FIG. 3, such that a vertical impact (e.g., an object that is slammed down with great force onto the weighing platform) acts upon one-dimensional flexures 510A, 510B, while load cell spring elements 505 remain largely or substantially completely unaffected. Thus, flexures 510A, 510B may serve as a vertical shock-protection mechanism for the relatively delicate load cell spring elements 505. Flexures 510A, 510B may be designed and adapted to exhibit, at a maximum load capacity for the load cell, a vertical deflection that is at most 3 times, at most 2 times, at most 1.5 times, at most 1.0 times, or at most 0.8 times, the vertical deflection exhibited by the load cell itself (without the flexure), at that maximum capacity.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A load cell assembly, comprising:
   (a) a load cell body including a spring element having a first cutout window defined, on a top side of said first cutout window, by a top beam on a top side of said load cell body, and on a bottom side of said first cutout window by a bottom beam, said window transversely disposed through a long dimension of said body;
   (b) at least one strain-sensing gage, bonded to said spring element, said strain-sensing gage adapted to measure a strain in said spring element; and
   (c) an at least two-dimensional flexural member having at least a second cutout window, said second cutout window being transversely disposed through said long dimension of said body, said flexural member being mechanically associated with said spring element, said flexural member disposed along a flexural longitudinal section of said load cell body that is defined by a length of said second cutout window along said long dimension, said flexural member being distally disposed with respect to said spring element along said long dimension of said body and having a proximal end adjacent the spring element and an opposite distal end; and
   (d) an adapter disposed on said top side of said load cell body, said adapter having a first end configured to receive a vertical load, and second end mechanically associated with the distal end of the flexural member; the adapter having an unloaded disposition and a loaded disposition in which said first end is depressed with respect to the proximal end of the flexural member;
   wherein said two-dimensional flexural member further includes a top-oriented cutout, said top-oriented cutout defining a top face of said adapter.

2. The load cell assembly of claim 1, wherein a load receiving position of said adapter is disposed within an area defined by a projection from said top side of said load cell body on said flexural member.

3. The load cell assembly of claim 2, wherein said adapter has a longitudinal length La between said first and second ends of said adapter, and wherein said load receiving position of said adapter is disposed on an inner half of said longitudinal length La.

4. The load cell assembly of claim 3, wherein said load receiving position of said adapter is disposed on an inner quarter of said longitudinal length La.

5. The load cell assembly of claim 2, wherein, in said loaded disposition, said load receiving position of said adapter is at least partially disposed within a hollow volume of said flexural member.

6. The load cell assembly of claim 2, said second cutout window including a plurality of cutout windows disposed one on top of another.

7. The load cell assembly of claim 6, wherein said cutout windows of said plurality of cutout windows have an average length $L_{avg}$, a maximum dimensionless length deviation of any of said windows from $L_{avg}$, being defined by:

$$|L_i-L_{avg}|/L_{avg},$$

$L_i$ being a particular length of any of said windows; said maximum dimensionless length deviation being less than 0.2.

8. The load cell assembly of claim 1, wherein the load receiving region of said adapter is located nearer to the spring element than is the distal end of the flexure member.

9. The load cell assembly of claim 1, wherein the load receiving region of said adapter is located nearer to the spring element than is the distal end of the flexure member, such that, in the loaded disposition, each of the spring element and the flexural member assumes a respective double-bending configuration in response to a load acting on the load receiving region of said adapter.

10. The load cell assembly of claim 1, wherein said adapter has a longitudinal length La between said first and second ends of said adapter, and wherein a load receiving position of said adapter is disposed on an inner third of said longitudinal length La.

11. The load cell assembly of claim 1, wherein a load receiving position of said adapter is disposed on an inner half of said length of said second cutout window.

12. The load cell assembly of claim 1, said adapter and said flexural member being integral with said load cell body.

13. Two load cell assemblies according to claim 1, said load cell body being a monolithic double load cell body integrally including said spring element and said flexural member of each of said assemblies.

14. The load cell assembly claim 1, the assembly further comprising a weighing platform disposed on a top face of said load cell body, and a base disposed underneath said load cell body.

15. The load cell assembly of claim 14, wherein, in an assembled configuration, a total height of said platform, said load cell body, and said base, is at most 40 mm.

16. A load cell assembly, comprising:
(a) a load cell body including a spring element having a first cutout window defined, on a top side of said first cutout window, by a top beam on a top side of said load cell body, and on a bottom side of said first cutout window by a bottom beam, said window transversely disposed through a long dimension of said body;
(b) at least one strain-sensing gage, bonded to said spring element, said strain-sensing gage adapted to measure a strain in said spring element; and
(c) an at least two-dimensional flexural member integral with said load cell body, said flexural member having at least a second cutout window, said second cutout window being transversely disposed through said long dimension of said body, said flexural member being mechanically associated with said spring element, said flexural member disposed along a flexural longitudinal section of said load cell body that is defined by a length of said second cutout window along said long dimension, said flexural member being distally disposed with respect to said spring element along said long dimension of said load body and having a proximal end adjacent the spring element and an opposite distal end; and
(d) an adapter disposed on said top side of said load cell body, said adapter having a first end configured to receive a vertical load, and second end mechanically associated with the distal end of the flexural member; the adapter having an unloaded disposition and a loaded disposition in which said first end is depressed with respect to the proximal end of the flexural member;
said second cutout window including a plurality of cutout windows disposed one on top of another;
wherein said two-dimensional flexural member further includes a top-oriented cutout, said top-oriented cutout defining a top face of said adapter;
wherein a load receiving position of said adapter is disposed within an area defined by a projection from said top side of said load cell body on said flexural member;
wherein said adapter has a longitudinal length La between said first and second ends of said adapter, and wherein said load receiving position of said adapter is disposed on an inner half of said longitudinal length La.

17. The load cell assembly of claim 16, said adapter adapted wherein, in said loaded disposition, said load receiving position of said adapter is at least partially disposed within a hollow volume of said flexural member.

18. The load cell assembly of claim 17, wherein said cutout windows of said plurality of cutout windows have an average length $L_{avg}$, a maximum dimensionless length deviation of any of said windows from $L_{avg}$, being defined by:

$$|L_i - L_{avg}|/L_{avg},$$

$L_i$ being a particular length of any of said windows;
said maximum dimensionless length deviation being less than 0.2.

19. A weighing scale assembly comprising: (a) the load cell assembly of claim 16; (b) a weighing platform disposed on a top face of said load cell body, and (c) a base disposed underneath said load cell body.

20. The weighing scale assembly of claim 19, wherein, in said loaded disposition, said load receiving position of said adapter is at least partially disposed within a hollow volume of said flexural member.

* * * * *